(12) United States Patent
Cho et al.

(10) Patent No.: US 12,259,145 B2
(45) Date of Patent: Mar. 25, 2025

(54) AIR CONDITIONER

(71) Applicant: SAMSUNG ELECTRONICS CO., LTD., Suwon-si (KR)

(72) Inventors: Sungoug Cho, Suwon-si (KR); Seonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 18/213,051

(22) Filed: Jun. 22, 2023

(65) Prior Publication Data

US 2023/0349562 A1   Nov. 2, 2023

Related U.S. Application Data

(63) Continuation of application No. PCT/KR2022/000512, filed on Jan. 12, 2022.

(30) Foreign Application Priority Data

Mar. 5, 2021   (KR) .................... 10-2021-0029639

(51) Int. Cl.
*F24F 1/0076*   (2019.01)
*F24F 1/0063*   (2019.01)
(Continued)

(52) U.S. Cl.
CPC .......... *F24F 1/0076* (2019.02); *F24F 1/0063* (2019.02); *F24F 1/0083* (2019.02);
(Continued)

(58) Field of Classification Search
CPC ...... F24F 1/0076; F24F 1/0063; F24F 1/0083; F24F 1/0071; F24F 1/0087; F24F 13/222;
(Continued)

(56) References Cited

U.S. PATENT DOCUMENTS

| 8,123,840 B2 | 2/2012 | Marra |
| 2021/0254874 A1 | 8/2021 | Chinaglia |

FOREIGN PATENT DOCUMENTS

| CN | 207146721 U | 3/2018 | |
| CN | 210602089 U * | 5/2020 | ............ F24F 12/006 |

(Continued)

OTHER PUBLICATIONS

International Search Report (PCT/ISA/210) issued by the International Searching Authority on May 6, 2022 in International Patent Application No. PCT/KR2022/000512.
(Continued)

*Primary Examiner* — Emmanuel E Duke
(74) *Attorney, Agent, or Firm* — Sughrue Mion, PLLC

(57) ABSTRACT

An air conditioner includes: a first heat exchanger disposed indoors; a second heat exchanger disposed outdoors and connected to the first heat exchanger; a water tank for accommodating water for generating steam; a filtering device for filtering indoor air; a first valve, which guides, to the water tank, the water for generating steam or guides, to the outdoors, remaining substances generated in the filtering device or condensate water generated in the first exchanger; and a second valve which is connected to the first valve by means of a connecting pipe, and which receives the water for generating steam or discharges the remaining substances or the condensate water transferred from the first valve.

15 Claims, 13 Drawing Sheets

(51) Int. Cl.
*F24F 1/0083* (2019.01)
*F24F 8/192* (2021.01)
*F24F 8/30* (2021.01)
*F24F 13/22* (2006.01)

(52) U.S. Cl.
CPC ............... *F24F 8/192* (2021.01); *F24F 8/30* (2021.01); *F24F 13/222* (2013.01)

(58) Field of Classification Search
CPC .... F24F 13/28; F24F 2110/64; F24F 2110/70; F24F 2110/76; F24F 2110/20; F24F 11/84; F25B 25/00; F25B 25/005; F25B 41/40; B01D 53/32; B01D 53/326; Y02B 30/70
See application file for complete search history.

(56) References Cited

FOREIGN PATENT DOCUMENTS

| | | | | | |
|---|---|---|---|---|---|
| JP | 2002349983 | A | * | 12/2002 | ............. Y02B 30/52 |
| JP | 2010-91120 | A | | 4/2010 | |
| KR | 2000-0033608 | A | | 6/2000 | |
| KR | 2000-0014299 | U | | 7/2000 | |
| KR | 2003-0085346 | A | | 11/2003 | |
| KR | 10-0486602 | B1 | | 5/2005 | |
| KR | 10-2006-0121034 | A | | 11/2006 | |
| KR | 20060121034 | A | * | 11/2006 | ............. F24F 13/222 |
| KR | 10-2009-0039721 | A | | 4/2009 | |
| KR | 101050253 | B1 | * | 7/2011 | .............. F24F 11/42 |
| KR | 10-2012-0075992 | A | | 7/2012 | |
| KR | 20120075992 | A | * | 7/2012 | ................ F24F 8/20 |
| KR | 101183236 | B1 | * | 9/2012 | .............. F24F 11/30 |
| KR | 10-1263754 | B1 | | 5/2013 | |
| KR | 10-1382507 | B1 | | 4/2014 | |
| KR | 10-2018-0007175 | A | | 1/2018 | |
| KR | 20180007175 | A | * | 1/2018 | .......... F24F 11/0008 |
| KR | 10-2018-0138486 | A | | 12/2018 | |
| KR | 20180138486 | A | * | 12/2018 | ................ F24F 3/06 |
| KR | 10-2019-0054797 | A | | 5/2019 | |
| KR | 10-2019-0054800 | A | | 5/2019 | |
| KR | 20190054979 | A | * | 5/2019 | ............ F24F 5/0017 |
| KR | 10-2020-0048377 | A | | 5/2020 | |
| KR | 20200048377 | A | * | 5/2020 | .............. F24F 5/001 |
| KR | 10-2119531 | B1 | | 6/2020 | |
| KR | 10-2124387 | B1 | | 6/2020 | |
| WO | 2019/240670 | A1 | | 12/2019 | |

OTHER PUBLICATIONS

Written Opinion (PCT/ISA/237) issued by the International Searching Authority on May 6, 2022 in International Patent Application No. PCT/KR2022/000512.

* cited by examiner

AIR CONDITIONER

CROSS-REFERENCE TO RELATED APPLICATION(S)

This application is a continuation application of International Application No. PCT/KR2022/000512, filed on Jan. 12, 2022, which is based on and claims priority to Korean Patent Application No. 10-2021-0029639, filed on Mar. 5, 2021, in the Korean Intellectual Property Office, the disclosures of which are incorporated by reference herein their entireties.

BACKGROUND

1. Field

The disclosure relates to an air conditioner, and more particularly, to an air conditioner capable of adjusting humidity of air and/or removing carbon dioxide.

2. Description of Related Art

An air conditioner is an apparatus for maintaining indoor air in a desired condition by adjusting temperature, humidity, air current, distribution, etc. while removing dust in the air.

In general, an air conditioner includes a cooling cycle configured with a compressor, a condenser, an expansion device, and an evaporator, and performs a cooling or heating operation according to a circulation direction of refrigerants. In a hot environment (e.g., summer), the air conditioner performs a cooling operation by absorbing indoor heat and discharging the heat to outdoors. In a cold environment (e.g., winter), the air conditioner performs a heating operation by absorbing outdoor heat and supplying the heat to indoors.

However, existing air conditioners have limitations in managing air quality. Particularly, in the cold environment, high indoor temperature lowers the humidity of indoor air, and users may be greatly inconvenienced by dry feeling. Also, management, such as removal of indoor fine dust, adjustment of carbon dioxide concentration, adjustment of oxygen concentration, humidity control, indoor deodorization, sterilization, etc., is required.

SUMMARY

Provided is an air conditioner capable of totally managing air quality.

Further, provided is an air conditioner capable of adjusting indoor humidity in cold environment.

Further still, provided is an air conditioner capable of easily supplying water for providing vapor, discharging condensate water and/or discharging carbon dioxide.

Additional aspects will be set forth in part in the description which follows and, in part, will be apparent from the description, or may be learned by practice of the presented embodiments.

According to an aspect of the disclosure, an air conditioner includes: a first heat exchanger positioned indoors; a second heat exchanger positioned outdoors and connected to the first heat exchanger; a water tank configured to accommodate water for generating vapor; a filtering device configured to filter indoor air; a first valve; a second valve; a connecting pipe connecting the first valve to the second valve; a water guiding pipe connecting the water tank to the first valve; a condensate water guiding pipe connecting the first heat exchanger to the first valve; and a residue guiding pipe connecting the filtering device to the first valve; wherein the first valve is configured to selectively (i) guide the water for generating vapor to the water tank via the water guiding pipe, (ii) guide residue generated in the filtering device to the second valve via the connecting pipe, and (iii) guide condensate water generated in the first heat exchanger to the second valve via the connecting pipe, and wherein the second valve is configured to selectively (i) guide the water for generating vapor to the first valve via the connecting pipe, and (ii) guide the residue or the condensate water transferred via the connecting pipe from the first valve to a discharge outlet.

The air conditioner may further include a first auxiliary heat exchanger configured to perform heat exchange with the first heat exchanger.

The air conditioner may further include a second auxiliary heat exchanger connected to the first auxiliary heat exchanger and configured to perform heat exchange with the water accommodated in the water.

The air conditioner may further include a water supply pipe connected to the second valve and configured to supply the water for generating vapor.

The air conditioner may further include a discharge pipe connected to the second valve and configured to discharge the residue or the condensate water.

Upon supply of the water for generating vapor, the water guiding pipe, the connecting pipe and the water supply pipe may communicate with each other.

Upon discharging of the condensate water, the condensate water guiding pipe, the connecting pipe and the discharge pipe may communicate with each other.

Upon discharging of the residue, the residue guiding pipe, the connecting pipe, and the discharge pipe may communicate with each other.

The air conditioner may further include: a first compressor configured to compress main refrigerants; a first expansion device configured to decompress the main refrigerants; a main refrigerant pipe through which the main refrigerants flow, the main refrigerant pipe connecting the first compressor, the first heat exchanger, the first expansion device, and the second heat exchanger to each other; a second compressor configured to compress auxiliary refrigerants; a second expansion device configured to decompress the auxiliary refrigerants; and an auxiliary refrigerant pipe through which the auxiliary refrigerants flow, the auxiliary refrigerant pipe connecting the second compressor, the second auxiliary heat exchanger, the second expansion device, and the first auxiliary heat exchanger to each other.

The air conditioner may further include a water pipe through which the water accommodated in the water tank flows and configured to perform heat exchange with the second auxiliary heat exchanger.

The filtering device may include at least one of a first filter configured to filter fine dust in indoor air, a second filter configured to capture carbon dioxide in indoor air, or a third filter configured to capture nitrogen in indoor air.

The filtering device may further include at least one electrochemical cell configured to capture carbon dioxide in indoor air according to a positive voltage applied thereto, and emit the captured carbon dioxide according to a negative voltage applied thereto.

Upon application of the negative voltage, the residue guiding pipe, the connecting pipe and the discharge pipe may communicate with each other.

The air conditioner may further include an ionizer configured to ionize indoor air.

The air conditioner may further include a processor configured to control the first valve and the second valve independently.

According to one or more embodiments of the disclosure, an air conditioner may totally manage air quality.

According to one or more embodiments of the disclosure, an air conditioner may improve a user's convenience by providing vapor to indoors in wintertime.

According to one or more embodiments of the disclosure, an air conditioner may easily supply water for generating vapor to be provided to indoors, remove condensate water generated in an indoor heat exchanger, and remove residue generated in a filtering device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
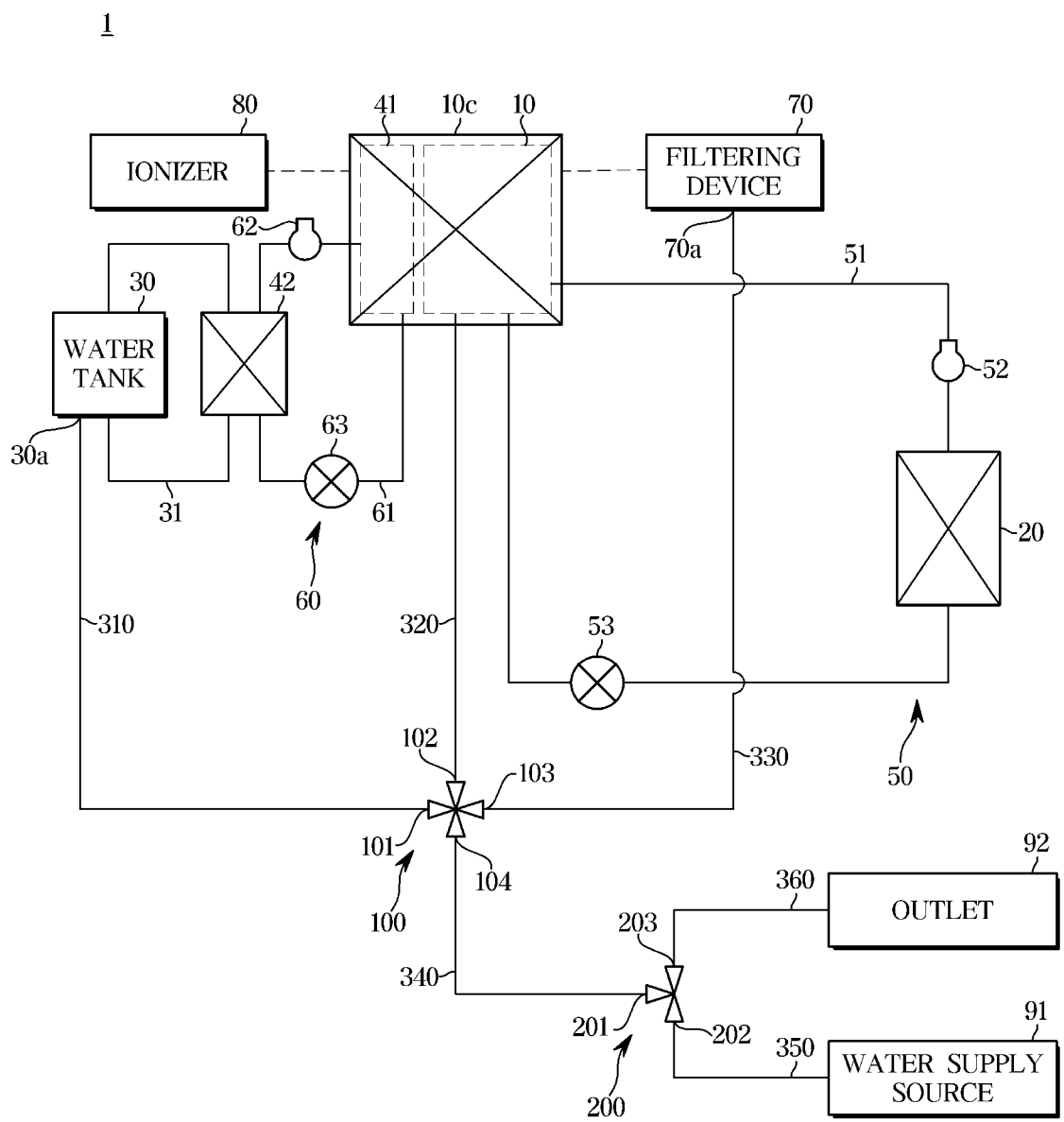
FIG. 1 shows an air conditioner according to an embodiment of the disclosure.

Configurations illustrated in the embodiments and the drawings described in the present specification are only example embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

It should be understood that, when a component is referred to as "connecting" or "being connected" to another component, it can directly connect or be connected to the other component or intervening components may also be present. Further, it should be understood that, when a component is referred to as "directly connecting" or "being directly connected" to another component, no intervening component may be present. Other expressions, such as, "between" and "directly between" or "adjacent to" and "directly adjacent to", describing the relationship between the components may be construed in the same manner.

In describing the embodiments of the disclosure, at least one of a plurality of elements may indicate all, any one, or combinations of the plurality of elements. For example, the expression, "at least one of a, b, or c," should be understood as including only a, only b, only c, both a and b, both a and c, both b and c, or all of a, b, and c.

An air conditioner which will be described below may include at least one of an air conditioner, a heater, an air conditioning system, a ventilator, an air cleaner, or a humidifier.

Hereinafter, embodiments of the disclosure will be described in detail with reference to the accompanying drawings.

Figure 2:
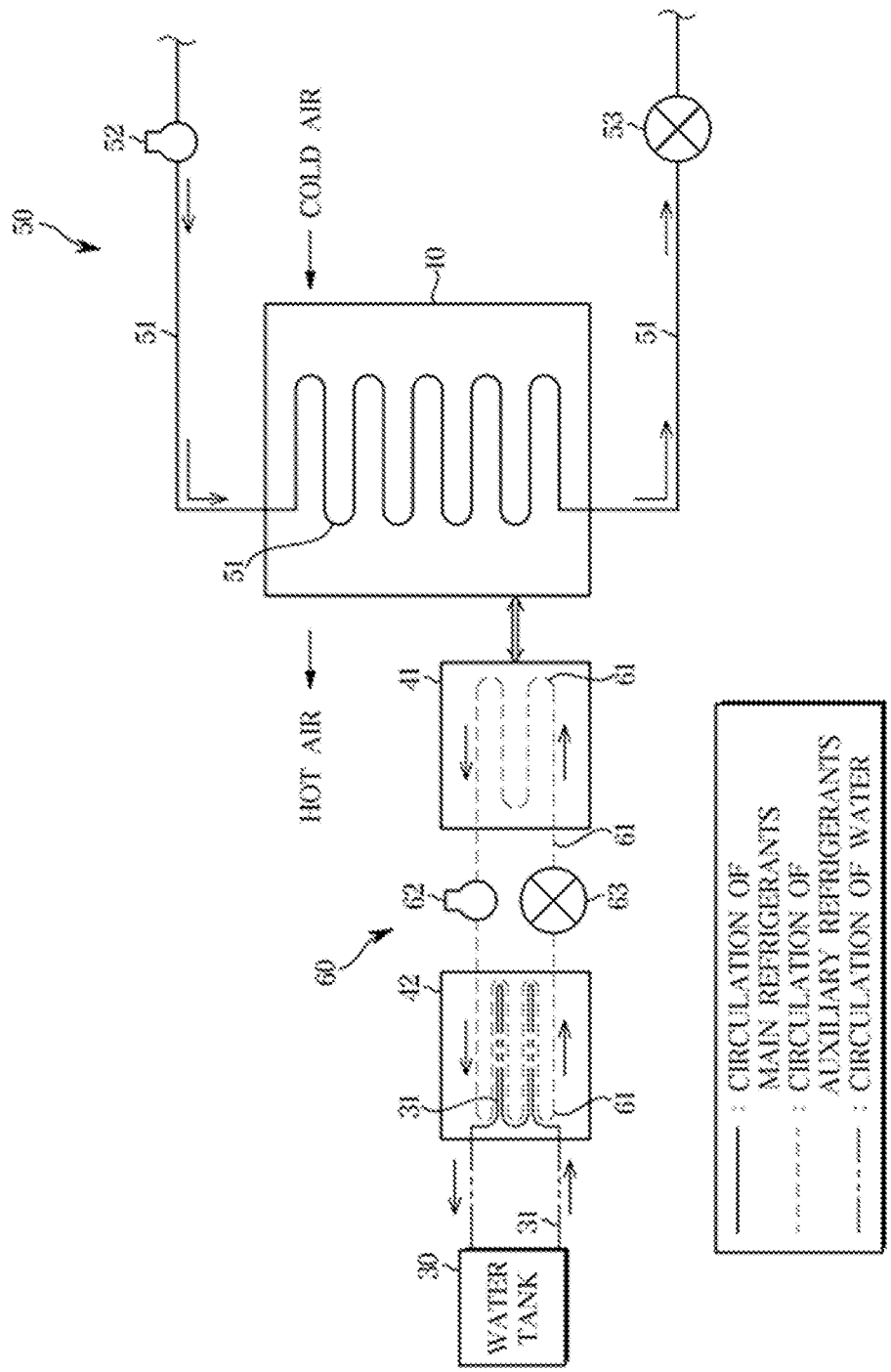
FIG. 2 schematically shows a heat exchange operation in the air conditioner shown in FIG. 1.
Figure 3:
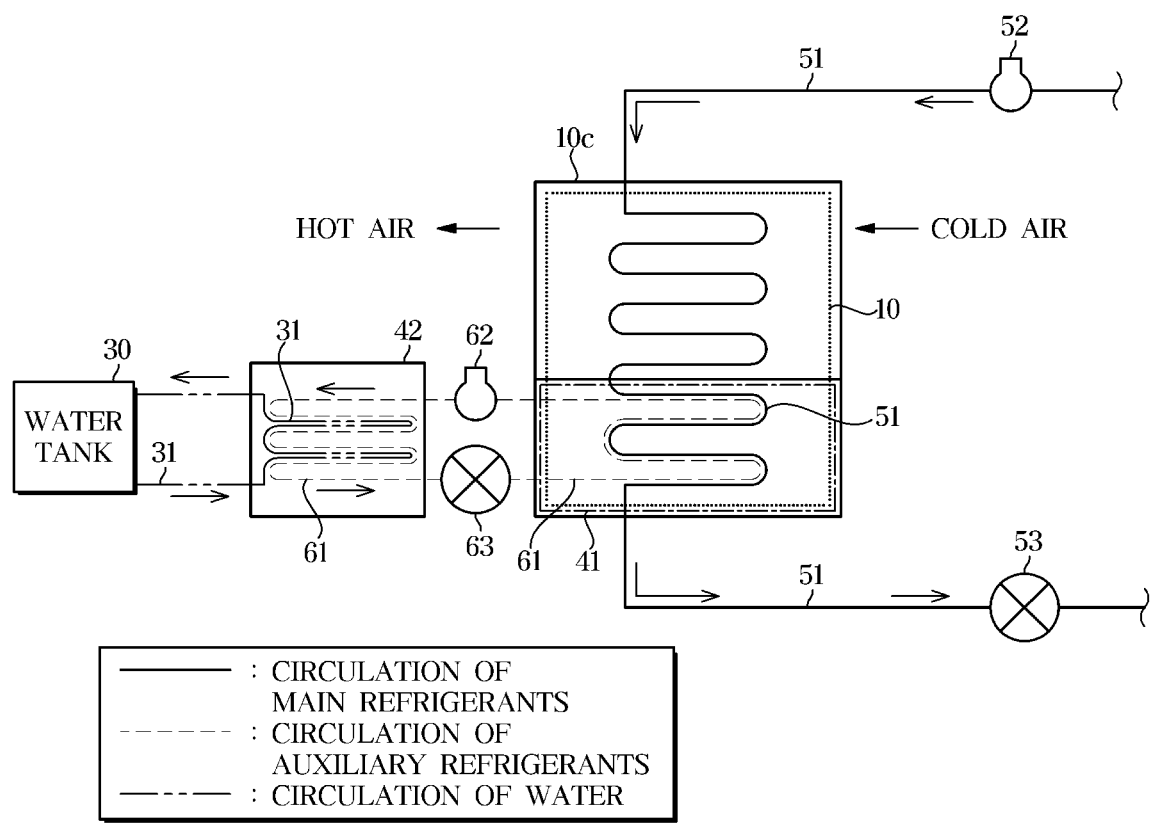
FIG. 3 schematically shows a heat exchange operation in the air conditioner shown in FIG. 1.
Figure 4:
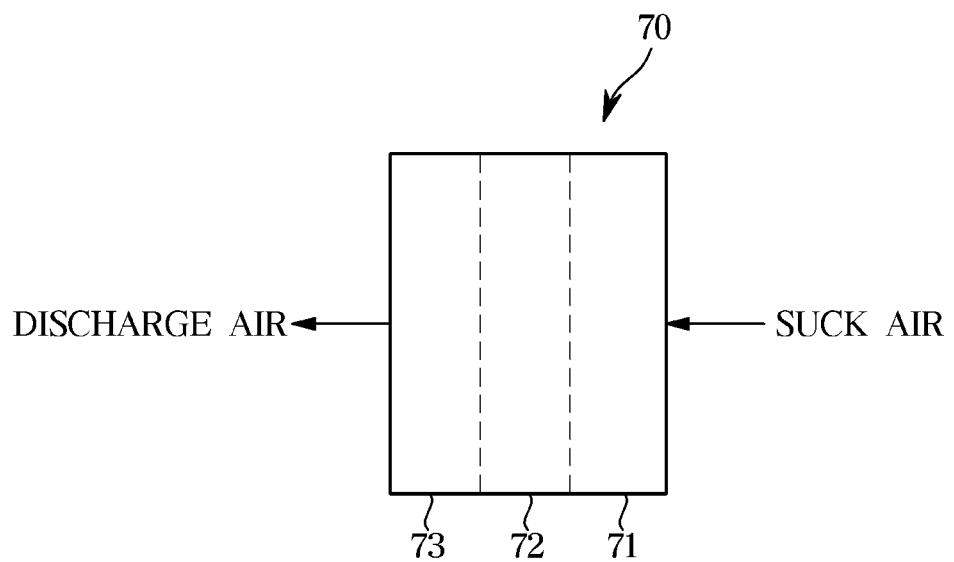
FIG. 4 schematically shows a filtering device of an air conditioner according to an embodiment of the disclosure.
Figure 5:
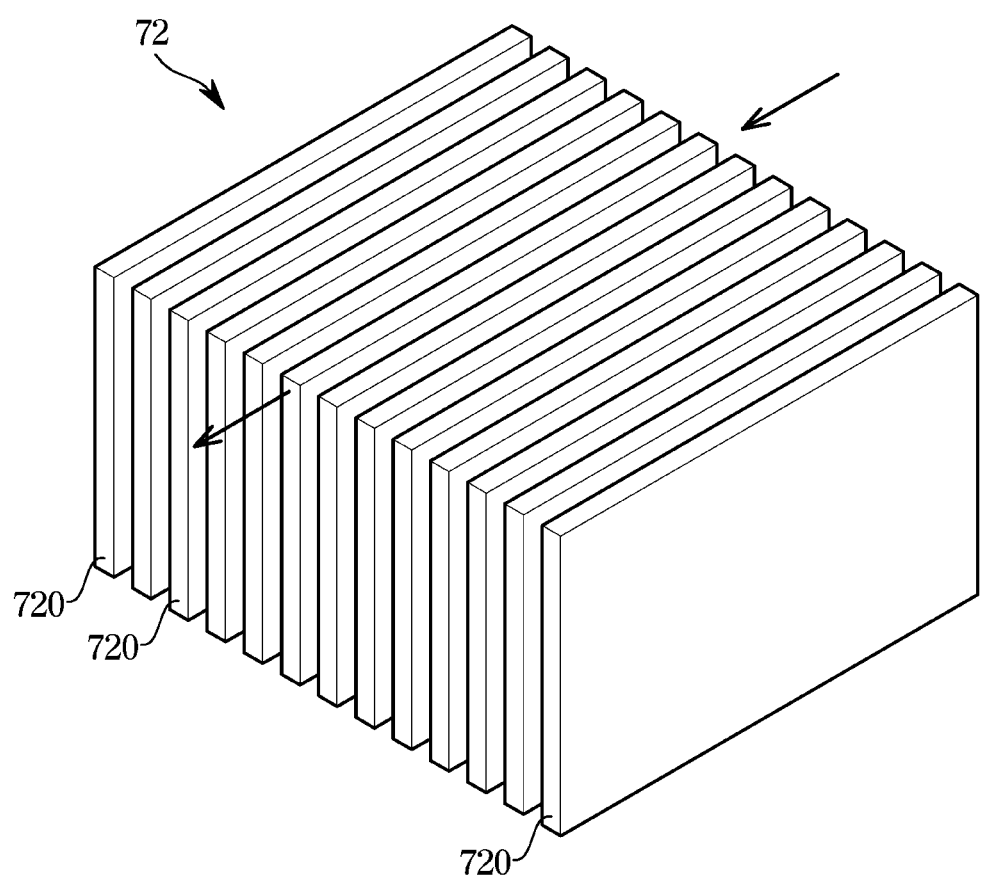
FIG. 5 schematically shows a second filter of an air conditioner according to an embodiment of the disclosure.
Figure 6:
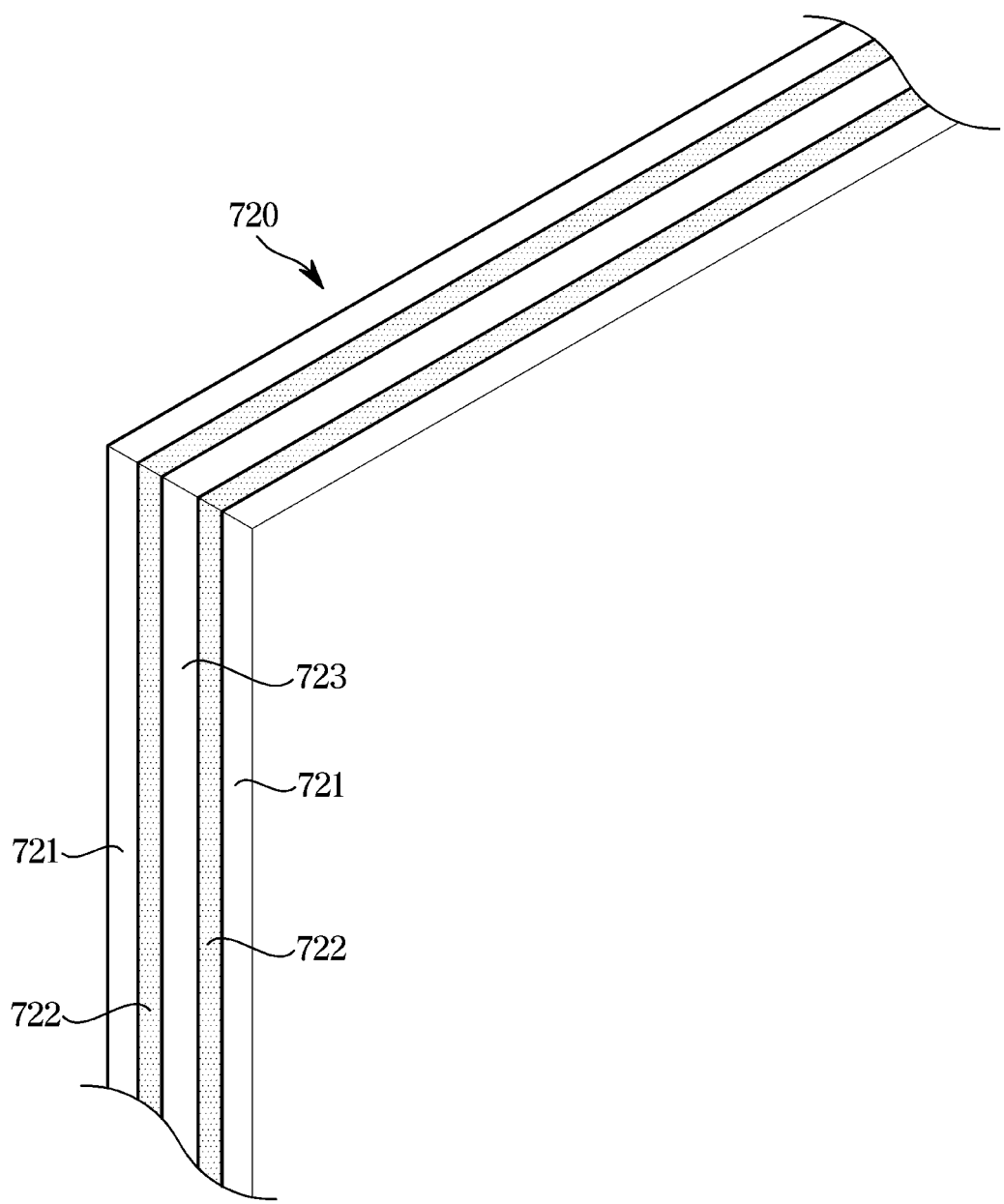
FIG. 6 shows an electrochemical cell of the second filter shown in FIG. 5.

FIG. 1 shows an air conditioner according to an embodiment of the disclosure. FIG. 2 schematically shows a heat exchange operation in the air conditioner shown in FIG. 1. FIG. 3 schematically shows a heat exchange operation in the air conditioner shown in FIG. 1. FIG. 4 schematically shows a filtering device of an air conditioner according to an embodiment of the disclosure. FIG. 5 schematically shows a second filter of an air conditioner according to an embodiment of the disclosure. FIG. 6 shows an electrochemical cell of the second filter shown in FIG. 5.

Referring to FIG. 1, an air conditioner 1 according to an embodiment of the disclosure may include a first heat exchanger 10 positioned at a first location, and a second heat exchanger 20 positioned at a second location different from the first location. The first location may be indoors, e.g. inside a building in which temperature is to be adjusted, and the second location may be outdoors, e.g., outside a building. The first heat exchanger 10 may be referred to as an indoor heat exchanger, and the second heat exchanger 20 may be referred to as an outdoor heat exchanger.

The first heat exchanger 10 may be provided indoors to perform heat exchange between indoor air and refrigerants. Also, the first heat exchanger 10 may be provided inside a casing 10c. The second heat exchanger 20 may be provided outdoors to perform heat exchange between outdoor air and refrigerants.

The first heat exchanger 10 may selectively include a cooling fin for improving efficiency of heat exchange between refrigerants and indoor air, and a blow fan for blowing indoor air subjected to heat exchange with the refrigerants in the first heat exchanger 10.

The second heat exchanger 20 may selectively include a cooling fin for improving efficiency of heat exchange between refrigerants and outdoor air, and a blow fan for blowing outdoor air subjected to heat exchange with the refrigerants in the second heat exchanger 20.

The air conditioner 1 may include a main refrigerant pipe 51. The main refrigerant pipe 51 may be a passage through which main refrigerants flow. The main refrigerant pipe 51 may connect the first heat exchanger 10 to the second heat exchanger 20 such that the main refrigerants circulate through the first heat exchanger 10 and the second heat exchanger 20.

The main refrigerant pipe 51 may form a closed loop, and a first compressor 52 and a first expansion device 53 may be positioned on the main refrigerant pipe 51.

The first compressor 52 may compress the main refrigerants. The first compressor 52 may be configured with, for example, an inverter compressor having a compression capacity changing according to an input frequency, or a plurality of constant-speed compressors having a constant compression capacity.

The first expansion device 53 may decompress the main refrigerants. Also, the first expansion device 53 may decompress the main refrigerants while adjusting an amount of refrigerants such that sufficient heat exchange occurs. The first expansion device 53 may include, for example, an electronic valve capable of adjusting an opening degree to adjust an amount of refrigerants.

More specifically, the first compressor 52, the first heat exchanger 10, the first expansion device 53, and the second heat exchanger 20 may be sequentially connected in series to each other by the main refrigerant pipe 51. Accordingly, a main cooling cycle apparatus 50 that performs a series of processes of compression-condensation-expansion-evaporation may be formed. The main cooling cycle apparatus 50 may perform an indoor cooling/heating mode (operation). The main cooling cycle apparatus 50 may perform a cooling mode or a heating mode according to a flow direction of refrigerants. The components of the main cooling cycle apparatus 50 may be controlled by a controller 500 which will be described below. For example, each of the first compressor 52 and the first expansion device 53 may be controlled by the controller 500.

Hereinafter, the indoor cooling/heating mode of the air conditioner 1 will be described.

First, the indoor cooling mode will be described below. The main refrigerants may circulate through the first compressor 52, the second heat exchanger 20, the first expansion device 53, and the first heat exchanger 10 in this order. More specifically, the main refrigerants may be compressed by passing through the first compressor 52. The compressed main refrigerants may be condensed by emitting heat while passing through the second heat exchanger 20. At this time, the second heat exchanger 20 may function as a condenser. The condensed main refrigerants may be decompressed by expanding while passing through the first expansion device 53. The expanded main refrigerants may absorb heat while passing through the first heat exchanger 10. At this time, the first heat exchanger 10 may function as an evaporator. In FIG. 1, the main refrigerants may flow in a clockwise direction through the main refrigerant pipe 51. By the circulation of the main refrigerants, the indoor cooling mode may be performed.

In succession, the indoor heating mode will be described below. The main refrigerants may circulate through the first compressor 52, the first heat exchanger 10, the first expansion device 53, and the second heat exchanger 20 in this order. More specifically, the main refrigerants may be compressed by passing through the first compressor 52. The compressed main refrigerants may be condensed by emitting heat while passing through the first heat exchanger 10. At this time, the first heat exchanger 10 may function as a condenser. The condensed main refrigerants may be decompressed by expanding while passing through the first expansion device 53. The expanded main refrigerants may absorb heat while passing through the second heat exchanger 20. At this time, the second heat exchanger 20 may function as an evaporator. In FIG. 1, the main refrigerants may flow in a counterclockwise direction through the main refrigerant pipe 51. By the circulation of the main refrigerants, the indoor heating mode may be performed.

The air conditioner 1 may include a water tank 30. The water tank 30 may provide vapor to indoors. That is, the water tank 30 may raise indoor humidity. For example, the water tank 30 may maintain indoor humidity at about 40% to 60% in wintertime by supplying vapor to indoors. Also, the water tank 30 may accommodate water for generating vapor. The water tank 30 may include an inlet 30a for receiving water for generating vapor.

Water accommodated in the water tank 30 may be heated through direct/indirect heat exchange with the first heat exchanger 10. That is, water accommodated in the water tank 30 may receive heat from the first heat exchanger 10.

For example, as shown in FIGS. 1 to 3, the water tank 30 may receive heat from the first heat exchanger 10 through an auxiliary cooling cycle apparatus 60 (will be described below) that performs heat exchange with the main cooling cycle apparatus 50.

More specifically, the auxiliary cooling cycle apparatus 60 may perform heat exchange with the main cooling cycle apparatus 50, and the auxiliary cooling cycle apparatus 60 that has performed heat exchange with the main cooling cycle apparatus 50 may perform heat exchange with water accommodated in the water tank 30. That is, the air conditioner 1 may perform heat exchange two times to provide vapor to indoors, and the water tank 30 may receive heat two times, although embodiments are not limited thereto. However, the water tank 30 may receive heat by various methods.

Water accommodated in the water tank 30 may flow through a water pipe 31. Water accommodated in the water tank 30 may be heated by heat exchange and vaporized. More specifically, water flowing along the water pipe 31 may be heated by performing heat exchange with auxiliary refrigerants flowing along an auxiliary refrigerant pipe 61 which will be described below. As a result, the water in the water tank 30 may be converted into vapor and the vapor may be provided to indoors. In other words, the water tank 30 may provide vapor to indoors by a vaporization method.

Also, the water tank 30 may have a relatively smaller size than the first heat exchanger 10, and accordingly, water accommodated in the water tank 30 may be rapidly heated and vaporized. That is, moisture may be rapidly provided to indoors.

Particularly, in a case in which an air conditioner performs a heating mode in wintertime, indoor air may become dry and a user may feel uncomfortable by dryness. Furthermore, dry indoor air may cause dermatitis, xerophthalmia, bronchitis, etc. To solve these problems, an ultrasonic method of providing moisture through ultrasonic waves has been used. However, the ultrasonic method provides moisture having relatively low temperature. Accordingly, the moisture may lower temperature of indoor air by being mixed with the indoor air during heating. That is, heating efficiency may deteriorate.

In contrast, because the air conditioner 1 includes the water tank 30 that provides moisture (vapor) by a vaporization method, temperature of moisture may be relatively high. That is, temperature of indoor air may be not lowered by moisture and heating efficiency may not deteriorate. Also, by heating water in the water tank 30 to evaporate the water, it may be possible to prevent bacteria, mold, etc. from being formed inside the water tank 30. As a result, according to an embodiment of the disclosure, a more comfortable indoor environment may be created.

Referring to FIGS. 1 to 3, the air conditioner 1 may include a first auxiliary heat exchanger 41 and a second auxiliary heat exchanger 42. The first auxiliary heat exchanger 41 may be connected to the second auxiliary heat exchanger 42 by the auxiliary refrigerant pipe 61 which will be described below. Hereinafter, for convenience of description, the first auxiliary heat exchanger 41 and the second auxiliary heat exchanger 42 may be collectively referred to as an auxiliary heat exchanger 40.

The first auxiliary heat exchanger 41 may be positioned adjacent to the first heat exchanger 10 to perform heat exchange with the first heat exchanger 10. More specifically, the auxiliary refrigerant pipe 61 passing through the first auxiliary heat exchanger 41 may perform heat exchange with the main refrigerant pipe 51 passing through the first heat exchanger 10. That is, heat exchange between main refrigerant and auxiliary refrigerants may occur.

For example, as shown in FIGS. 1 and 3, the first auxiliary heat exchanger 41 may be provided inside the casing 10c together with the first heat exchanger 10. More specifically, the auxiliary refrigerant pipe 61 passing through the first auxiliary heat exchanger 41 and the main refrigerant pipe 51 passing through the first heat exchanger 10 may be integrated into a double pipe, although embodiments are not limited thereto. However, as shown in FIG. 2, the first auxiliary heat exchanger 41 may be separated from the first heat exchanger 10. That is, the first auxiliary heat exchanger 41 and the first heat exchanger 10 may have independent casings and be provided as separate components.

The second auxiliary heat exchanger 42 may be connected to the first auxiliary heat exchanger 41. Also, the second auxiliary heat exchanger 42 may be positioned between the first heat exchanger 10 and the water tank 30. The second auxiliary heat exchanger 42 may perform heat exchange with water accommodated in the water tank 30. More specifically, the auxiliary refrigerant pipe 61 passing through the second auxiliary heat exchanger 42 may perform heat exchange with the water pipe 31 passing through the water tank 30. That is, heat exchange between auxiliary refrigerants and water may occur.

Auxiliary refrigerants heated by heat exchange of the first heat exchanger 10 and the first auxiliary heat exchanger 41 may be again heated by circulating through the auxiliary refrigerant pipe 61. The auxiliary refrigerants again heated may perform heat exchange with water flowing through the water pipe 31 in the second auxiliary heat exchanger 42.

As a result, the water accommodated in the water tank 30 may be rapidly heated by receiving heat two times through two-times heat exchange. That is, vapor for indoor humidification may be rapidly generated.

The air conditioner 1 may include the auxiliary refrigerant pipe 61. The auxiliary refrigerant pipe 61 may be a passage through which auxiliary refrigerants flow. The auxiliary refrigerant pipe 61 may connect the first auxiliary heat exchanger 41 to the second auxiliary heat exchanger 42 such that auxiliary refrigerants circulate through the first auxiliary heat exchanger 41 and the second auxiliary heat exchanger 42.

The auxiliary refrigerant pipe 61 may form a closed loop, and a second compressor 62 and a second expansion device 63 may be provided on the auxiliary refrigerant pipe 61.

The second compressor 62 may compress auxiliary refrigerants. The second compressor 62 may be configured with, for example, an inverter compressor having a compression capacity changing according to an input frequency, or a plurality of constant-speed compressors having a constant compression capacity.

The second expansion device 63 may decompress the auxiliary refrigerants. Also, the second expansion device 63 may decompress the auxiliary refrigerants while adjusting an amount of refrigerants such that sufficient heat exchange occurs. The second expansion device 63 may include, for example, an electronic valve capable of adjusting an opening degree to adjust an amount of refrigerants.

More specifically, the second compressor 62, the second auxiliary heat exchanger 42, the second expansion device 63, and the first auxiliary heat exchanger 41 may be sequentially connected in series to each other by the auxiliary refrigerant pipe 61. Accordingly, the auxiliary cooling cycle apparatus 60 that performs a series of processes of compression-condensation-expansion-evaporation may be formed. The auxiliary cooling cycle apparatus 60 may perform heat exchange with the main cooling cycle apparatus 50. The components of the auxiliary cooling cycle apparatus 60 may be controlled by the controller 500 which will be described below. For example, each of the second compressor 62 and the second expansion device 63 may be controlled by the controller 500.

For example, the first heat exchanger 10, a portion of the main refrigerant pipe 51, the auxiliary cooling cycle apparatus 60, the water tank 30, and the water pipe 31 may be provided inside a housing of an indoor unit.

The air conditioner 1 may include a filtering device 70. The filtering device 70 may filter indoor air. The filtering device 70 may filter fine dust in indoor air. Also, the filtering device 70 may capture carbon dioxide and/or nitrogen in indoor air. Accordingly, a concentration of fine dust, carbon dioxide and/or oxygen in indoor air may be adjusted to create a more comfortable indoor environment.

For example, the filtering device 70 may adjust fine dust in indoor air to about 80 $\mu g/m^3$ or less, carbon dioxide to about 1,000 ppm or less and oxygen to about 22% to 23%. The filtering device 70 may be controlled by the controller 500 which will be described below.

The filtering device 70 may include an outlet 70a for discharging residue, such as fine dust, carbon dioxide, nitrogen, etc., separated from indoor air by purifying the indoor air.

As shown in FIG. 4, the filtering device 70 may include at least one of a first filter 71, a second filter 72, or a third filter 73. The first filter 71, the second filter 72, and the third filter 73 may operate independently.

Each of the first filter 71, the second filter 72, and the third filter 73 may be detachably installed in the filtering device 70. Accordingly, a user may freely select a configuration of the first filter 71, the second filter 72, and the third filter 73. Also, the first filter 71, the second filter 72, and the third filter 73 may be controlled independently by the controller 500 which will be described below. Accordingly, whether or not to operate each of the first filter 71, the second filter 72, or the third filter 73 may be set.

In FIG. 4, the first filter 71, the second filter 72, and the third filter 73 may be arranged in this order based on a flow direction of air. However, the arrangement is only an example, and the arrangement order is not limited.

The first filter 71 may filter fine dust in indoor air. For example, the first filter 71 may include at least one of a prefilter, a HEPA filter, a carbon filter, or an ultraviolet (UV) lamp. The prefilter may filter impurities having large particles, such as pollen or normal dust. The HEPA filter may filter impurities having small particles such as fine dust. The carbon filter may remove bad smell. The UV lamp may perform a sterilization function. However, the first filter 71 is not limited to these, and the first filter 71 may include a filter having various materials and/or structures.

The second filter 72 may capture carbon dioxide in indoor air. That is, the second filter 72 may remove carbon dioxide in indoor air and lower a concentration of carbon dioxide in indoor air. More specifically, as shown in FIG. 5, the second filter 72 may include at least one electrochemical cell 720. For example, the electrochemical cell 720 may be configured with a plurality of pieces that are arranged in parallel.

The electrochemical cell 720 may capture and discharge carbon dioxide by using an Electro-Swing Adsorption (ESA) method. That is, the electrochemical cell 720 may capture or discharge carbon dioxide according to a voltage applied thereto. For example, the electrochemical cell 720 may capture carbon dioxide in indoor air according to a positive (+) voltage applied thereto. At this time, the carbon dioxide may be adsorbed on a surface of the electrochemical cell 720. In contrast, the electrochemical cell 720 may discharge the captured carbon dioxide according to a negative (−) voltage applied thereto. At this time, the adsorbed carbon dioxide may be desorbed from the electrochemical cell 720 and discharged.

Referring to FIG. 6, the electrochemical cell 720 may include a pair of active electrodes 721 and a relative electrode 723 positioned between the pair of active electrodes 721. Also, a separator 722 may be provided between the active electrodes 721 and the relative electrode 723. For example, the active electrodes 721 may be electrodes coated with a $CO_2$-binding quinone-carbon nanotube (Q-CNT) composite, and the relative electrode 723 may be an electrode coated with a ferrocene-carbon nanotube (Fc-CNT) composite, although embodiments are not limited thereto. However, the electrochemical cell 720 may be configured with various structures and/or materials for capturing carbon dioxide.

The third filter 73 may raise an oxygen ratio of indoor air by capturing nitrogen in the indoor air. Generally, a nitrogen ratio in air is about 78%, and by capturing nitrogen in indoor air, a concentration of oxygen may be improved. That is, the third filter 73 may adjust a concentration of oxygen of indoors by capturing nitrogen.

An ionizer 80 may ionize indoor air. The ionizer 80 may include two electrodes having a great voltage difference. For example, one of the two electrodes of the ionizer 80 may be a very low negative electrode, and another one may be a ground electrode to emit negative ions. More specifically, the ionizer 80 may remove harmful germ and bacteria in air by emitting ion molecules to indoors. Accordingly, the ionizer 80 may help users who live indoor to be prevented from suffering from disease such as atopy and bronchial disease. Also, the ionizer 80 may give an effect that cleans surrounding air by removing smell of life, etc. That is, the ionizer 80 may be effective in indoor sterilization and smell removal.

Figure 7:
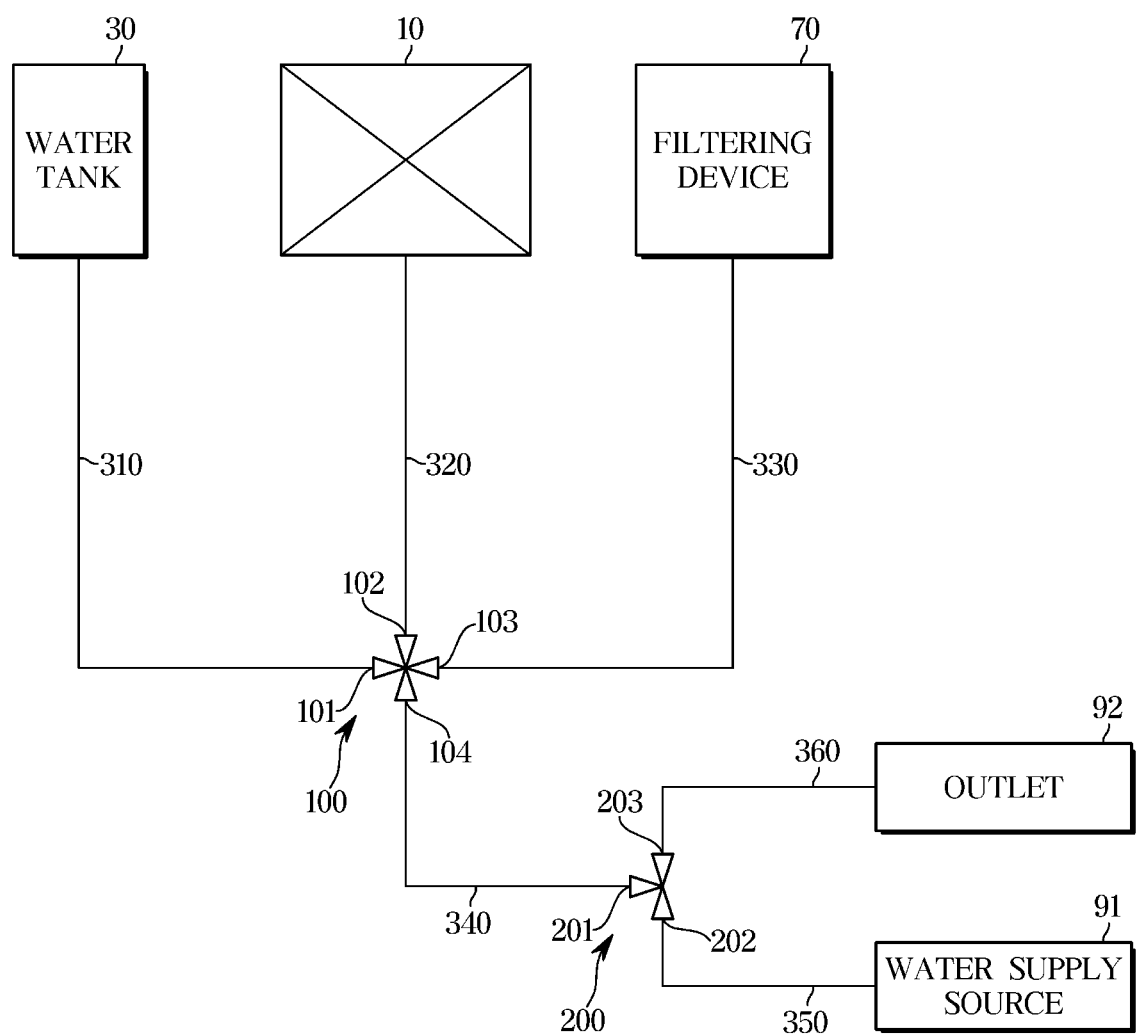
FIG. 7 schematically shows an air conditioner according to an embodiment of the disclosure.
Figure 8:
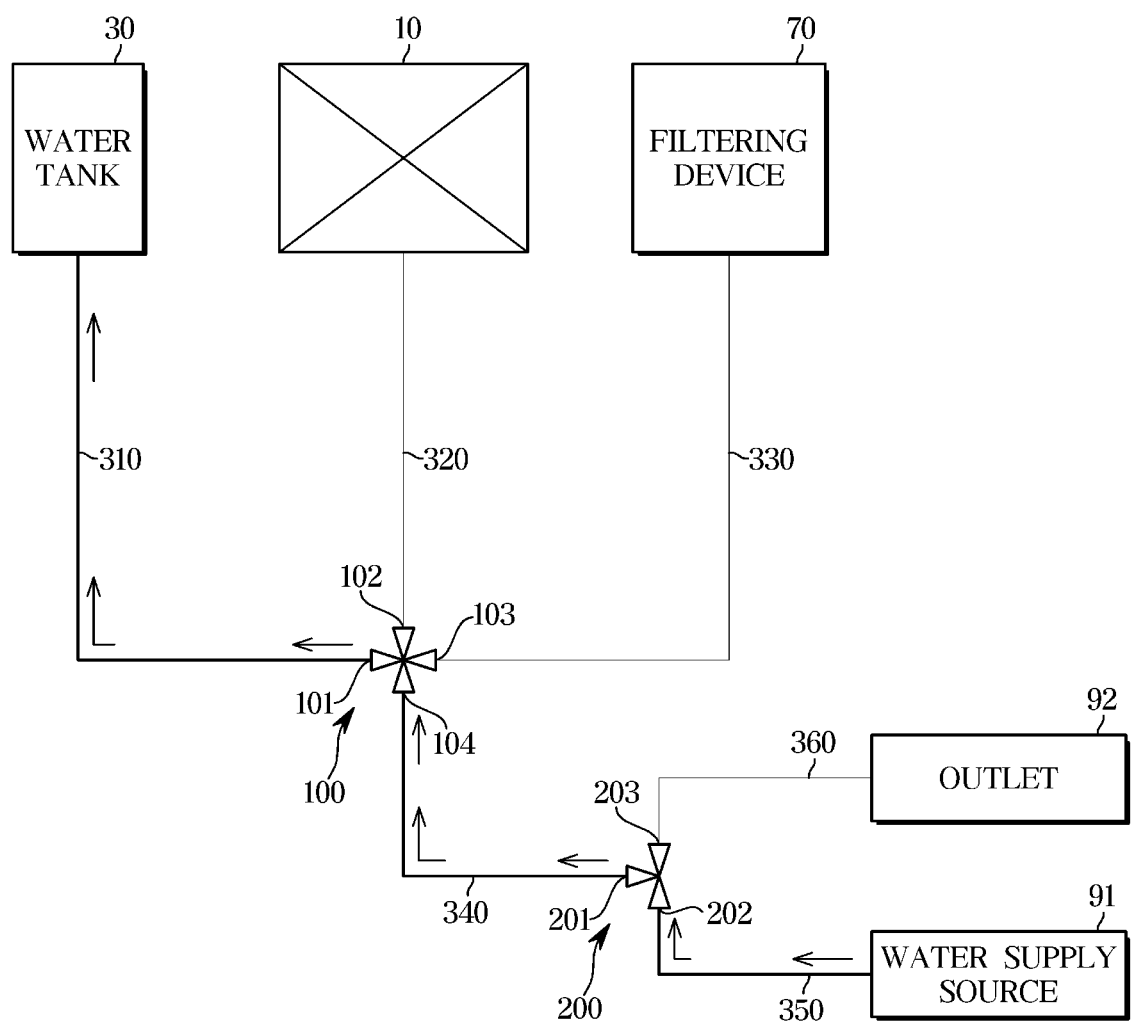
FIG. 8 schematically shows a water supply mode of the air conditioner shown in FIG. 7.
Figure 9:
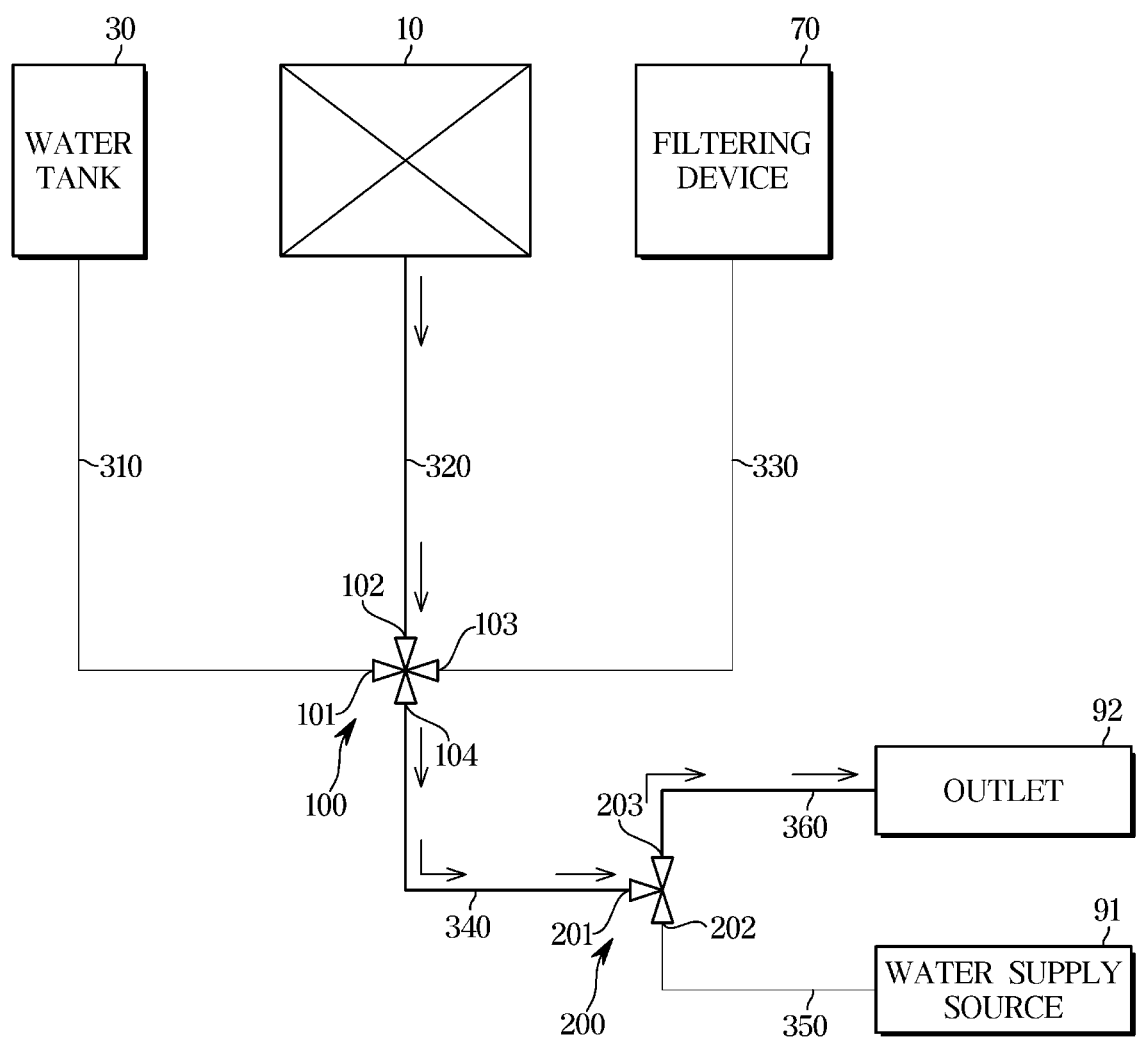
FIG. 9 schematically shows a condensate water discharge mode of the air conditioner shown in FIG. 7.
Figure 10:
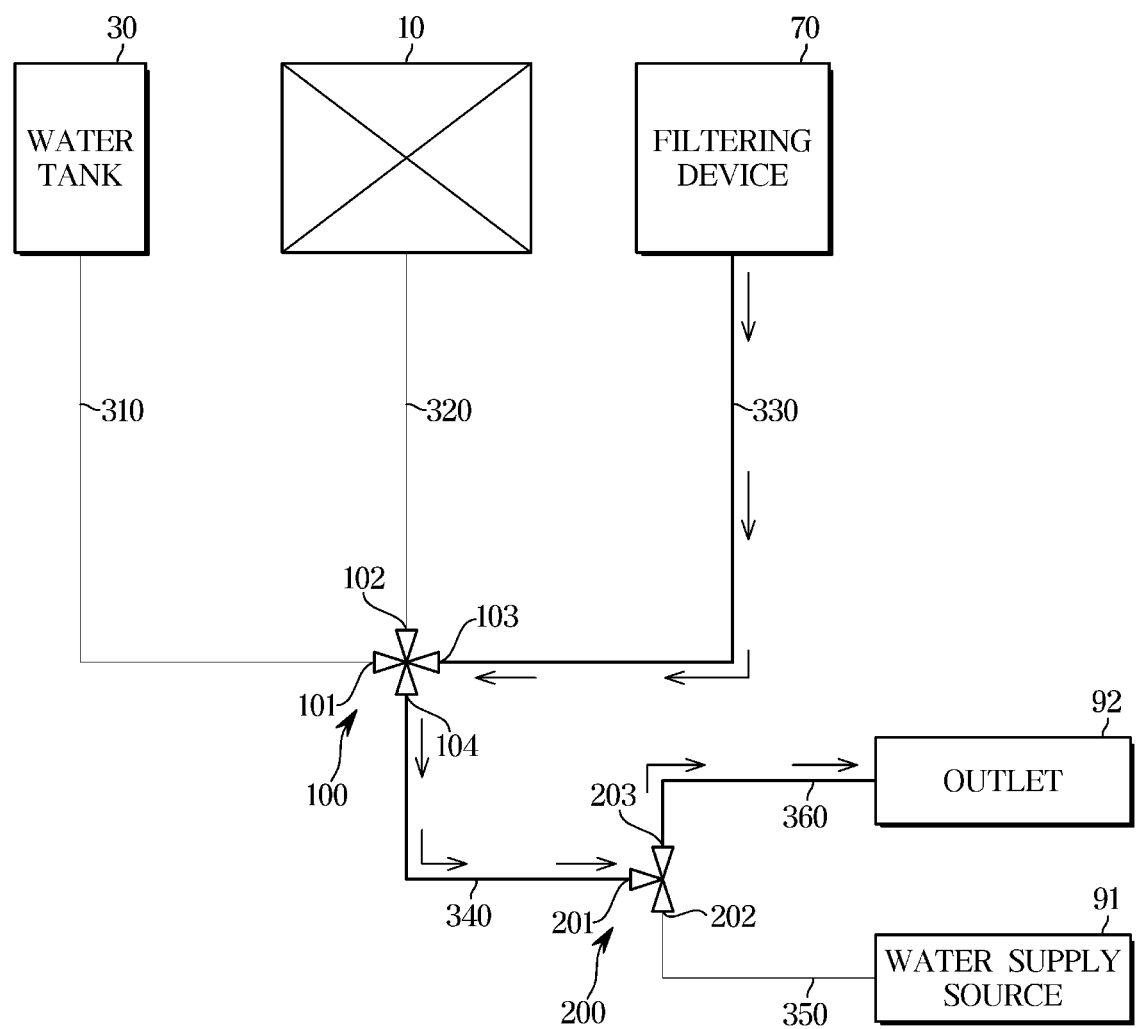
FIG. 10 schematically shows a residue discharge mode of the air conditioner shown in FIG. 7.

FIG. 7 schematically shows an air conditioner according to an embodiment of the disclosure. FIG. 8 schematically shows a water supply mode of the air conditioner shown in FIG. 7. FIG. 9 schematically shows a condensate water discharge mode of the air conditioner shown in FIG. 7. FIG. 10 schematically shows a residue discharge mode of the air conditioner shown in FIG. 7.

Referring to FIGS. 7 to 10, the air conditioner 1 may include a first valve 100. The first valve 100 may be connected to the water tank 30, the first heat exchanger 10, and the filtering device 70. The first valve 100 may guide water for generating vapor to the water tank 30, or guide residue generated in the filtering device or condensate water generated in the first heat exchanger 10 to outdoors. Also, the first valve 100 may be connected to a second valve 200 which will be described below. The first valve 100 may be connected to the second valve 200 by a connecting pipe 340.

More specifically, the first valve 100 may be a 4-way valve. The first valve 100 may include a first port 101, a second port 102, a third port 103, and a fourth port 104. The first port 101 may be connected to the water tank (specifically, the inlet 30a) 30 by a water guiding pipe 310. The second port 102 may be connected to the first heat exchanger 10 by a condensate water guiding pipe 320. The third port 103 may be connected to the filtering device (specifically, the outlet 70a) 70 by a residue guiding pipe 330. The fourth port 104 may be connected to the second valve 200 by the connecting pipe 340.

The air conditioner 1 may include the water guiding pipe 310, the condensate water guiding pipe 320, and the residue guiding pipe 330. Also, the air conditioner 1 may include the connecting pipe 340.

The water guiding pipe 310 may connect the water tank 30 to the first valve 100. More specifically, the water guiding pipe 310 may connect the inlet 30a of the water tank 30 to the first port 101 of the first valve. Water for generating vapor may enter the water tank 30 by flowing through the water guiding pipe 310.

The condensate water guiding pipe 320 may connect the first heat exchanger 10 to the first valve 100. More specifically, the condensate water guiding pipe 320 may connect the first heat exchanger 10 to the second port 102 of the first valve 100. Particularly, in an indoor cooling mode of the air conditioner 1, indoor hot air may contact the cooled main refrigerant pipe 51 of the first heat exchanger 10, and accordingly, condensate water may be generated in the first heat exchanger 10. The condensate water generated in the first heat exchanger 10 may flow through the condensate water guiding pipe 320.

The residue guiding pipe 330 may connect the filtering device 70 to the first valve 100. More specifically, the residue guiding pipe 330 may connect the outlet 70a of the filtering device 70 to the third port 103 of the first valve. Residue (specifically, carbon dioxide) generated in the filtering device 70 may flow through the residue guiding pipe 330.

An outlet 92 may discharge residue generated in the filtering device 70 or condensate water generated in the first heat exchanger 10. The outlet 92 may be provided outdoors and directly discharge residue and/or condensate water, although embodiments are not limited thereto. However, the outlet 92 may be provided indoors and communicate with outdoors.

Also, a water supply source 91 may supply water for generating vapor. The water supply source 91 may be provided indoors or outdoors.

Referring to FIGS. 7 to 10, the air conditioner 1 may include the second valve 200. The second valve 200 may be connected to the first valve 100 by the connecting pipe 340. The second valve 200 may receive water for generating vapor, or discharge residue or condensate water transferred from the first valve 100. More specifically, the second valve 200 may be connected to the first valve 100, the water supply source 91, and the outlet 92. The second valve 200 may receive water for generating vapor from the water supply source 91, or transfer residue or condensate water transferred from the first valve 100 to the outlet 92.

The second valve 200 may be a 3-way valve. The second valve 200 may include a first port 201, a second port 202, and a third port 203. The first port 201 may be connected to the fourth port 104 of the first valve 100 by the connecting pipe 340. The second port 202 may be connected to the water supply source 91 by a water supply pipe 350. The third port 203 may be connected to the outlet 92 by a discharge pipe 360.

The air conditioner 1 may include the water supply pipe 350 and the discharge pipe 360.

The water supply pipe 350 may connect the water supply source 91 to the second valve 200. More specifically, the water supply pipe 350 may connect the water supply source 91 to the second port 202 of the second valve 200. Water for generating vapor may be supplied from the water supply source 91 and flow through the water supply pipe 350.

The discharge pipe 360 may connect the outlet 92 to the second valve 200. More specifically, the discharge pipe 360 may connect the outlet 92 to the third port 203 of the second valve 200. Residue and/or condensate water transferred from the first valve 100 may flow through the discharge pipe 360.

The air conditioner 1 may perform a water supply mode, a condensate water discharge mode, and a residue discharge mode.

The water supply mode may be a mode for supplying water for generating vapor to the water tank 30. In the water supply mode, the first port 101 and the fourth port 104 of the first valve 100 may be in an ON state, and the second port 102 and the third port 103 of the first valve 100 may be in an OFF state. Also, the first port 201 and the second port 202 of the second valve 200 may be in an ON state, and the third port 203 of the second valve 200 may be in an OFF state. Accordingly, as shown in FIG. 8, in the water supply mode, the water guiding pipe 310, the connecting pipe 340, and the water supply pipe 350 may communicate with each other.

The condensate water discharge mode may be a mode for discharging condensate water generated in the first heat exchanger 10. In the condensate water discharge mode, the second port 102 and the fourth port 104 of the first valve 100 may be in an ON state, and the first port 101 and the third port 103 of the first valve 100 may be in an OFF state. Also, the first port 201 and the third port 203 of the second valve 200 may be in an ON state, and the second port 202 may be in an OFF state. Accordingly, as shown in FIG. 9, in the condensate water discharge mode, the condensate water guiding pipe 320, the connecting pipe 340, and the discharge pipe 360 may communicate with each other.

The residue discharge mode may be a mode for discharging residue (specifically, carbon dioxide) generated in the filtering device 70. In the residue discharge mode, the third port 103 and the fourth port 104 of the first valve 100 may be in an ON state, and the first port 101 and the second port 102 of the first valve 100 may be in an OFF state. Also, the first port 201 and the third port 203 of the second valve 200 may be in an ON state, and the second port 202 may be in an OFF state. Accordingly, as shown in FIG. 10, in the residue discharge mode, the residue guiding pipe 330, the connecting pipe 340, and the discharge pipe 360 may communicate with each other. For example, according to a negative (−) voltage applied to the electrochemical cell 720, the residue guiding pipe 330, the connecting pipe 340, and the discharge pipe 360 may communicate with each other to discharge captured carbon dioxide.

Figure 11:
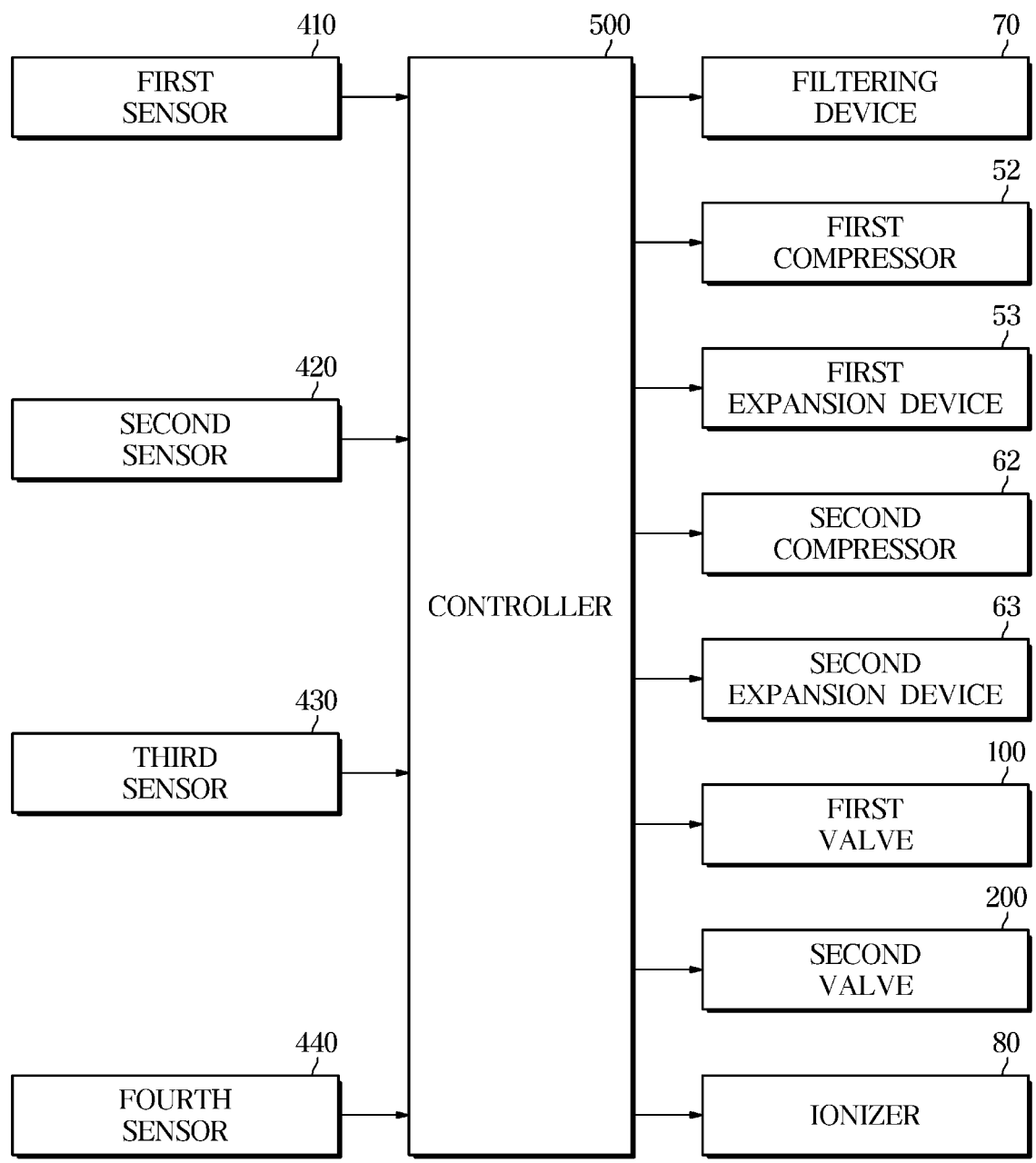
FIG. 11 shows a controller of an air conditioner according to an embodiment of the disclosure.

Referring to FIG. 11, the air conditioner 1 may further include the controller 500. The controller 500 may control and command various operations of structures including components of the air conditioner 1. For example, the controller 500 may be implemented as a hardware circuit or processor, such as a Central Processing Unit (CPU), a micro-processor, a chipset, a system-on-chip (SOC), etc., mounted on a printed circuit board, although embodiments are not limited thereto.

The controller 500 may receive a signal from a first sensor 410, a second sensor 420, a third sensor 430, and a fourth sensor 440, which will be described below.

The controller 500 may output a signal to the first valve 100 and the second valve 200. Accordingly, whether or not to open each of the ports 101, 102, 103, and 104 of the first valve 100 may be set, and whether or not to open each of the ports 201, 202, and 203 of the second valve 200 may be set. For example, the controller 500 may select the water supply mode, the condensate water discharge mode, or the residue discharge mode of the air conditioner 1 by controlling the first valve 100 and the second valve 200.

The controller 500 may output a signal to the filtering device 70. Accordingly, whether or not to operate the filtering device 70 of the air conditioner 1 may be set. For example, operations of the first filter 71, the second filter 72, and the third filter 73 may be controlled independently by the controller 500.

The controller 500 may output a signal to the main cooling cycle apparatus 50. Specifically, the controller 500 may output a signal to the first compressor 52 and the first expansion device 53 of the main cooling cycle apparatus 50. Accordingly, the controller 500 may control a flow direction of main refrigerants of the main cooling cycle apparatus 50. That is, the indoor cooling/heating mode of the air conditioner 1 may be selected.

Also, the controller 500 may output a signal to the auxiliary cooling cycle apparatus 60. Specifically, the controller 500 may output a signal to the second compressor 62 and the second expansion device 63 of the auxiliary cooling cycle apparatus 60. Accordingly, the controller 500 may control a flow direction of auxiliary refrigerants of the auxiliary cooling cycle apparatus 60. That is, to heat water accommodated in the water tank 30, the controller 500 may control a flow of auxiliary refrigerants such that the auxiliary refrigerants circulating through the auxiliary cooling cycle apparatus 60 perform heat exchange with the water accommodated in the water tank 30.

The controller 500 may output a signal to the ionizer 80. Accordingly, the controller 500 may control an operation of the ionizer 80.

For example, signal transmission/reception of the controller 500 may be performed in a wired and/or wireless manner.

The air conditioner 1 may include at least one of the first sensor 410, the second sensor 420, the third sensor 430, or the fourth sensor 440.

The first sensor 410 may detect a concentration of fine dust, carbon dioxide, and/or oxygen in indoor air. The first sensor 410 may transfer a signal to the controller 500, and the controller 500 may operate an operation of the filtering device 70 based on the signal received from the first sensor 410. For example, the controller 500 may set whether or not to operate each of the first filter 71, the second filter 72, and the third filter 73.

The second sensor 420 may detect indoor temperature. The second sensor 420 may transfer a signal to the controller 500, and the controller 500 may set a flow direction (a clockwise direction or a counterclockwise direction in FIG. 1) of main refrigerants of the main cooling cycle apparatus 50 based on the signal received from the second sensor 420. That is, an operation of the indoor cooling mode or the indoor heating mode may be controlled. Specifically, the controller 500 may transfer a signal to the first compressor 52 and the first expansion device 53 to switch a flow of the main refrigerants by operations of the first compressor 52 and the first expansion device 53.

The third sensor 430 may detect indoor moisture. The third sensor 430 may transfer a signal to the controller 500, and the controller 500 may control operations of the first valve 100 and the second valve 200 based on the signal received from the third sensor 430. For example, according to a detection of moisture that is equal to or lower than a preset reference by the third sensor 430, the third sensor 430 may send a signal to the controller 500. In this case, the controller 500 which has received the signal from the third sensor 430 may output a signal to the first valve 100 and the second valve 200 and control operations of the first valve 100 and the second valve 200. More specifically, the controller 500 may control operations of the first valve 100 and the second valve 200 such that the first port 101 and the fourth port 104 of the first valve 100 open and the first port 201 and the second port 202 of the second valve 200 open. Accordingly, as shown in FIG. 8, the water guiding pipe 310, the connecting pipe 340, and the water supply pipe 350 may communicate with each other, and water for generating vapor may enter the water tank 30 from the water supply source 91.

The controller 500 may set a flow direction of auxiliary refrigerants of the auxiliary cooling cycle apparatus 60 based on the signal received from the third sensor 430. For example, the controller 500 may control a flow of auxiliary refrigerants such that water accommodated in the water tank 30 performs heat exchange with the auxiliary refrigerants circulating through the auxiliary cooling cycle apparatus 60. More specifically, to heat the water accommodated in the water tank 30 to provide vapor to indoors, the auxiliary refrigerants may circulate in the counterclockwise direction in FIGS. 2 and 3. However, the circulation direction of refrigerants has been described based on the drawings, and the circulation direction of refrigerants may depend on a configuration and/or arrangement of a cooling cycle apparatus.

The fourth sensor 440 may detect indoor smell and/or a degree of sterilization. The fourth sensor 440 may transfer a signal to the controller 500, and the controller 500 may control an operation of the ionizer 80 based on the signal received from the fourth sensor 440. For example, according to a detection of bad smell in indoors or a detection of harmful bacteria that is equal to or more than a preset reference, the controller 500 may control the ionizer 80 to operate.

Hereinafter, an air conditioner 2 according to another embodiment of the disclosure will be described. Like reference numerals or symbols represent members or components that perform the substantially same functions, and accordingly, detailed descriptions thereof will be omitted.

Figure 12:
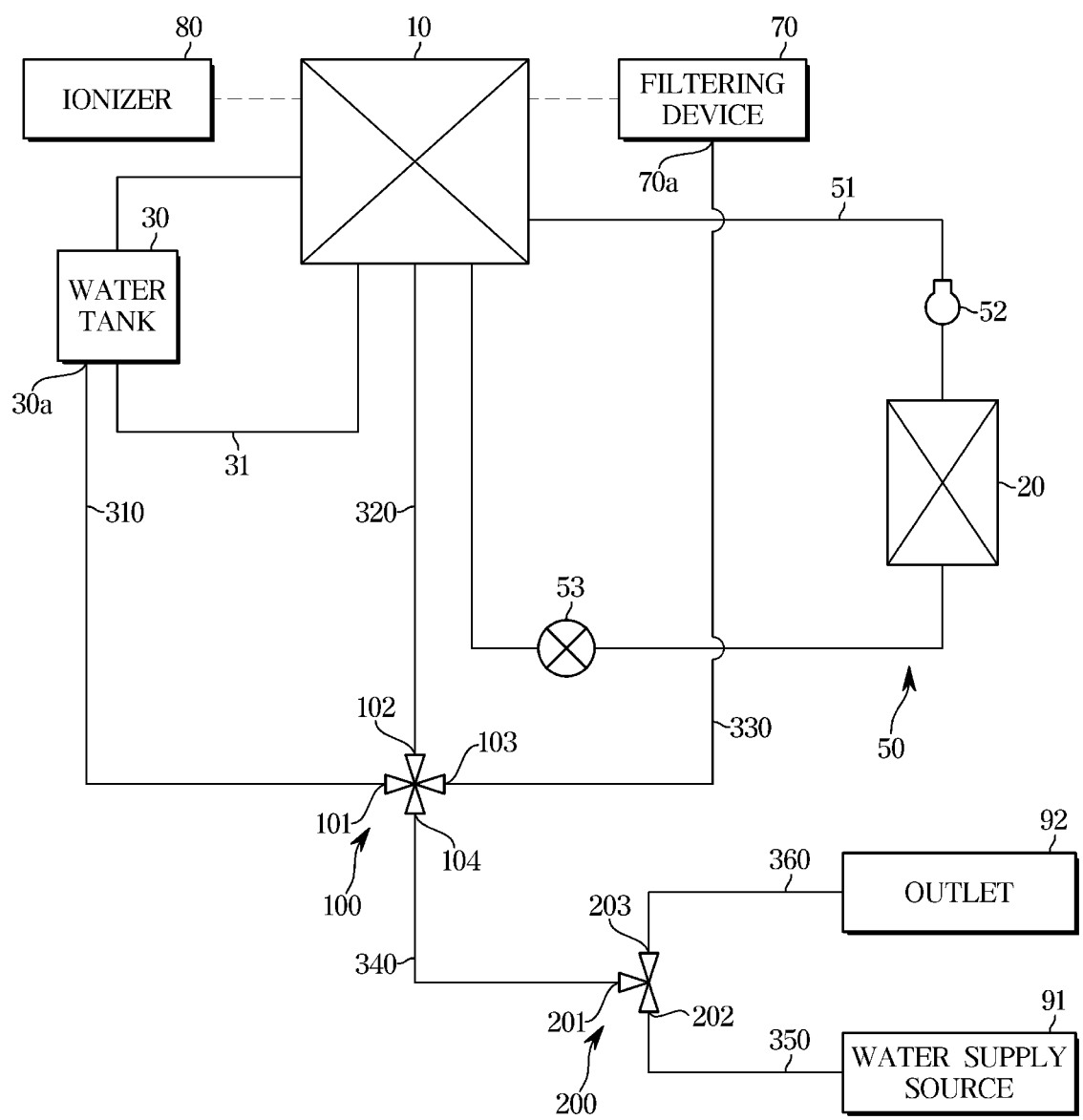
FIG. 12 shows an air conditioner according to another embodiment of the disclosure.
Figure 13:
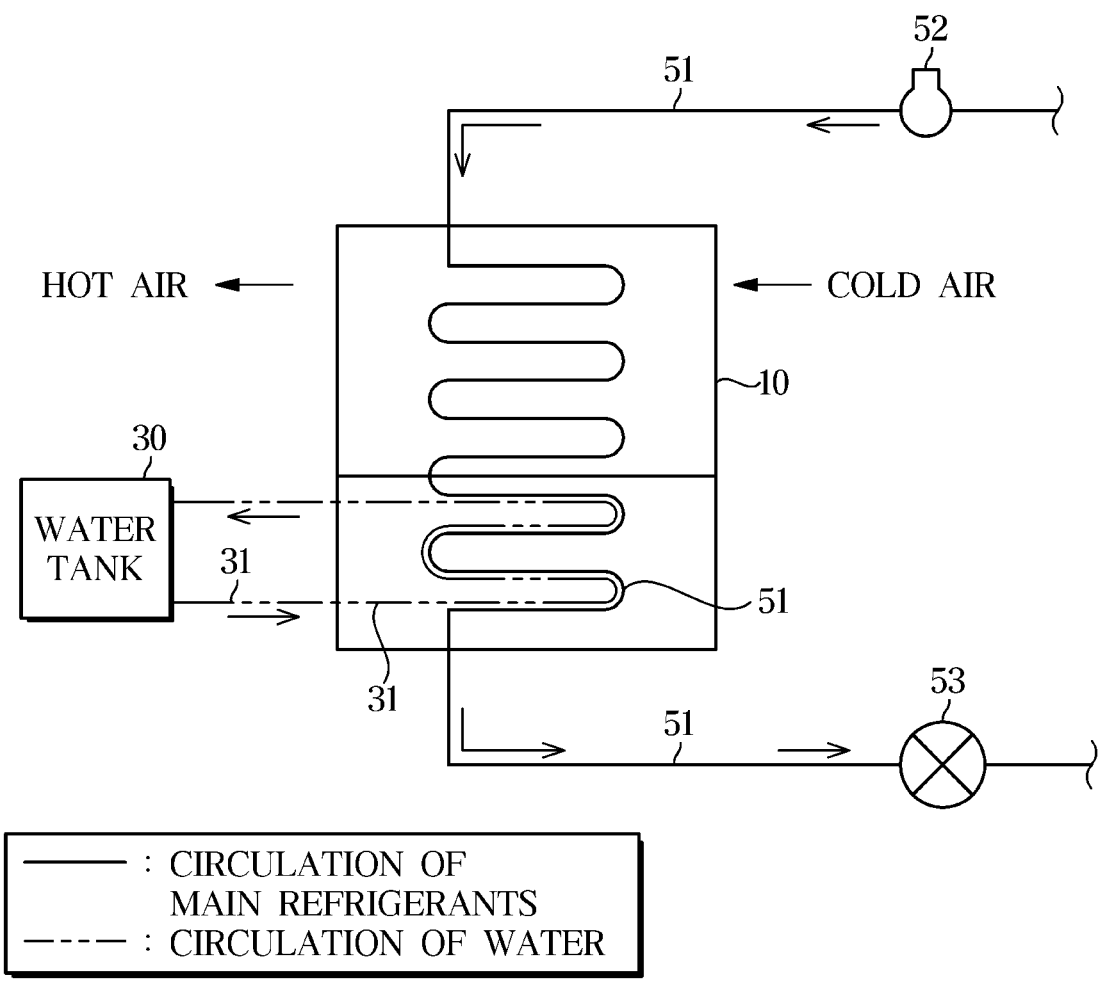
FIG. 13 schematically shows a heat exchange operation in the air conditioner shown in FIG. 12.

FIG. 12 shows an air conditioner according to another embodiment of the disclosure. FIG. 13 schematically shows a heat exchange operation in the air conditioner shown in FIG. 12.

Compared to the air conditioner 1 according to the above-described embodiment, the air conditioner 2 may include no component corresponding to the auxiliary cooling cycle apparatus 60. Other components and/or structures of the air conditioner 2 than the auxiliary cooling cycle apparatus 60 may be the substantially same as those of the air conditioner 1.

As shown in FIGS. 12 and 13, the water tank 30 may perform heat exchange with the first heat exchanger 10. More specifically, the water pipe 31 through which water for generating vapor circulates may perform heat exchange with the main refrigerant pipe 51 passing through the first heat exchanger 10. That is, heat exchange between main refrigerants and water may occur.

For example, the first heat exchanger 10, a portion of the main refrigerant pipe 51, the water tank 30, and the water pipe 31 may be provided inside the housing of the indoor unit.

Compared to the air conditioner 1 according to the above-described embodiment, the air conditioner 2 may have a simpler structure because of including no component corresponding to the auxiliary cooling cycle apparatus 60. For example, components, such as the second compressor, the second expansion device, the auxiliary heat exchanger, the auxiliary refrigerant pipe, etc., may be omitted, and accordingly, the air conditioner 2 may have a compact size. Also, power consumed during an operation of the air conditioner 2 may be reduced.

A user may select an appropriate configuration and structure of the air conditioner by considering an installation place of the air conditioner, a heat exchanger capacity, an area of an indoor space, etc.

So far, specific embodiments have been shown and described. However, the disclosure is not limited to the above-described embodiments, and various modifications can be made by those skilled in the art to which the disclosure belongs without departing from the gist of the technical idea of the disclosure defined by the claims below.

What is claimed is:

1. An air conditioner comprising:
   a first heat exchanger positioned indoors;
   a second heat exchanger positioned outdoors and connected to the first heat exchanger;
   a water tank configured to accommodate water for generating vapor;
   a filtering device configured to filter indoor air;
   a first valve;
   a second valve;
   a connecting pipe connecting the first valve to the second valve;
   a water guiding pipe connecting the water tank to the first valve;
   a condensate water guiding pipe connecting the first heat exchanger to the first valve; and
   a residue guiding pipe connecting the filtering device to the first valve;
   wherein the first valve is configured to selectively (i) guide the water for generating vapor to the water tank via the water guiding pipe, (ii) guide residue generated in the filtering device to the second valve via the connecting pipe, and (iii) guide condensate water generated in the first heat exchanger to the second valve via the connecting pipe, and wherein the second valve is configured to selectively (i) guide the water for generating vapor to the first valve via the connecting pipe, and (ii) guide the residue or the condensate water transferred via the connecting pipe from the first valve to a discharge outlet.

2. The air conditioner of claim 1, further comprising a first auxiliary heat exchanger configured to perform heat exchange with the first heat exchanger.

3. The air conditioner of claim 2, further comprising a second auxiliary heat exchanger connected to the first auxiliary heat exchanger and configured to perform heat exchange with the water accommodated in the water.

4. The air conditioner of claim 3, further comprising:
a first compressor configured to compress main refrigerants;
a first expansion device configured to decompress the main refrigerants;
a main refrigerant pipe through which the main refrigerants flow, the main refrigerant pipe connecting the first compressor, the first heat exchanger, the first expansion device, and the second heat exchanger to each other; a second compressor configured to compress auxiliary refrigerants;
a second expansion device configured to decompress the auxiliary refrigerants; and
an auxiliary refrigerant pipe through which the auxiliary refrigerants flow, the auxiliary refrigerant pipe connecting the second compressor, the second auxiliary heat exchanger, the second expansion device, and the first auxiliary heat exchanger to each other.

5. The air conditioner of claim 3, further comprising a water pipe through which the water accommodated in the water tank flows and configured to perform heat exchange with the second auxiliary heat exchanger.

6. The air conditioner of claim 1, further comprising a water supply pipe connected to the second valve and configured to supply the water for generating vapor.

7. The air conditioner of claim 6, further comprising a discharge pipe connected to the second valve and configured to discharge the residue or the condensate water.

8. The air conditioner of claim 7, wherein upon discharging of the condensate water, the condensate water guiding pipe, the connecting pipe and the discharge pipe communicate with each other.

9. The air conditioner of claim 7, wherein upon discharging of the residue, the residue guiding pipe, the connecting pipe, and the discharge pipe communicate with each other.

10. The air conditioner of claim 7, further comprising a processor configured to control the first valve and the second valve independently.

11. The air conditioner of claim 6, wherein upon supply of the water for generating vapor, the water guiding pipe, the connecting pipe and the water supply pipe communicate with each other.

12. The air conditioner of claim 1, wherein the filtering device comprises at least one of a first filter configured to filter fine dust in indoor air, a second filter configured to capture carbon dioxide in indoor air, or a third filter configured to capture nitrogen in indoor air.

13. The air conditioner of claim 1, wherein the filtering device further comprises at least one electrochemical cell configured to capture carbon dioxide in indoor air according to a positive voltage applied thereto, and emit the captured carbon dioxide according to a negative voltage applied thereto.

14. The air conditioner of claim 13, wherein upon application of the negative voltage, the residue guiding pipe, the connecting pipe and the discharge pipe communicate with each other.

15. The air conditioner of claim 1, further comprising an ionizer configured to ionize indoor air.

* * * * *